(12) United States Patent
Kinnunen

(10) Patent No.: US 6,898,180 B2
(45) Date of Patent: May 24, 2005

(54) CONNECTION ADMISSION IN A COMMUNICATIONS NETWORK

(75) Inventor: Matti Kinnunen, Helsinki (FI)

(73) Assignee: Nokia Corporation, Espoo (FI)

( * ) Notice: Subject to any disclaimer, the term of this patent is extended or adjusted under 35 U.S.C. 154(b) by 557 days.

(21) Appl. No.: 10/013,892

(22) Filed: Dec. 10, 2001

(65) Prior Publication Data

US 2002/0057649 A1 May 16, 2002

Related U.S. Application Data

(63) Continuation of application No. PCT/FI00/00345, filed on Apr. 20, 2000.

(30) Foreign Application Priority Data

Jun. 8, 1999 (FI) .................................................. 991308
Nov. 15, 1999 (FI) ............................................. 19992450

(51) Int. Cl.$^7$ ............................ H04J 3/16; H04J 12/16; H04Q 11/04
(52) U.S. Cl. .................... 370/230; 370/235; 370/395.2; 709/232; 710/29
(58) Field of Search ............................... 370/230, 230.1, 370/231, 232, 235, 389, 395.1, 395.2, 395.21, 395.5, 395.41, 395.7, 395.72; 709/230, 232, 234, 238; 910/29, 36, 52, 56

(56) References Cited

U.S. PATENT DOCUMENTS

| | | | | |
|---|---|---|---|---|
| 5,862,126 A | * | 1/1999 | Shah et al. | 370/395.21 |
| 5,881,049 A | * | 3/1999 | Beshai et al. | 370/395.21 |
| 5,917,804 A | * | 6/1999 | Shah et al. | 370/230 |
| 6,459,681 B1 | * | 10/2002 | Oliva | 370/232 |
| 6,504,820 B1 | * | 1/2003 | Oliva | 370/232 |
| 6,665,264 B1 | * | 12/2003 | Davison et al. | 370/230 |
| 6,735,172 B1 | * | 5/2004 | Gibbs et al. | 370/235 |
| 6,771,648 B1 | * | 8/2004 | Kim et al. | 370/395.2 |

FOREIGN PATENT DOCUMENTS

| | | |
|---|---|---|
| EP | 0814632 | 12/1997 |
| EP | 0862299 | 9/1998 |
| EP | 0914016 | 5/1999 |
| EP | 0926922 | 6/1999 |
| WO | 97/01895 | 1/1997 |
| WO | 97/47165 | 10/1997 |
| WO | 98/22224 | 6/1998 |
| WO | 98/41052 | 9/1998 |
| WO | 99/12379 | 3/1999 |

* cited by examiner

Primary Examiner—Alpus H. Hsu
(74) Attorney, Agent, or Firm—Squire, Sanders & Dempsey L.L.P.

(57) ABSTRACT

The invention relates to Connection Admission Control (CAC). In response to a connection request received from a traffic source, a set of input data is specified and when necessary a set of results is calculated by means of the input data. A total capacity requirement is then estimated on the basis of set of results and the capacity requirement of existing connections. In order to obtain a connection admission control which can be flexibly adapted to the various constantly changing network environments, the sets of input data and the corresponding sets of results relating to previous requests are stored in a cache. When a new connection request arrives, a similar set of data is searched for in the cache. When it is found, the stored set of results is used directly for estimating the total capacity, and the calculation is omitted.

19 Claims, 4 Drawing Sheets

CONNECTION ADMISSION IN A COMMUNICATIONS NETWORK

This application is a continuation of international application Ser. No. PCT/FI00/00345, filed 20 Apr. 2000.

FIELD OF THE INVENTION

This invention relates to Connection Admission Control (CAC) in communications networks, especially in ATM-based broadband networks.

BACKGROUND OF THE INVENTION

ATM (Asynchronous Transfer Mode) is a known connection-oriented packet-switching technique, which has been selected by the international organization for telecommunications standardization ITU-T as the target transfer mode solution for implementing a broadband multimedia network (B-ISDN). In these networks many traffic sources are bursty, whereby the transmission capacity required at some moment is high and the capacity required at another moment is low. Bursts may be described as a phenomenon whereby a set of cells (a burst) arrives at short intervals and the following set (burst) arrives after a relatively long time. Since different connections need different capacities and the need varies quickly, statistical multiplexing is used in an ATM-based network. The statistical characteristics of bursty traffic sources are utilized in statistical multiplexing: when a large set of traffic sources are combined, the combined traffic behaves in a more stable manner than the individual sources, and although the transmission speed of an individual traffic source varies, the combined transmission speed of mutually independent individual traffic sources is almost constant. By using statistical multiplexing, it is possible to serve more connections with the same resources, i.e. the utilization rate of the network can be increased.

In spite of statistical multiplexing, congestion and overload will still occur in the network, caused both by unpredictable statistical variations in the traffic and by failure situations occurring in the network. Since it is impossible to know with sufficient accuracy the services to be provided, the volume of traffic brought about by the services, and the exact characteristics of the traffic sources, the occurrence of congestion is unavoidable in a network. The purpose of traffic and congestion control is to protect the network and the user so that the desired quality of a service is achieved.

Traffic control is intended to prevent the occurrence of congestion situations, while congestion control reacts to congestion situations detected in the network. From the point of view of the quality of service (QoS), most significant are the traffic control functions which try to prevent congestion situations in advance, of which Connection Admission Control (CAC) is the most important preventive traffic control method. CAC is defined as the set of procedures taken by the network during the call (virtual connection) set-up phase, or during the call re-negotiation phase, to determine whether a connection request can be accepted or rejected. CAC accepts a connection only when sufficient resources are available at each successive link in the circuit, and when the new connection will not adversely affect the quality of service of existing connections.

Several different methods of implementing CAC are known. These methods are based either on traffic parameters stated by the user or on traffic measurements taking place in the network element. It is possible to estimate the quality of service or the capacity requirement which can be expected, according to traffic parameters, either with the aid of pre-computed tables as in methods termed "indirect" or by computing in real time based on traffic parameters supplied in the connection request, as in methods termed "direct".

The traffic parameters defined by ATM Forum and describing the inherent characteristics of a traffic source requesting a connection are: Peak Cell Rate (PCR), Sustainable Cell Rate (SCR), Maximum Burst Size (MBS), and Minimum Cell Rate (MCR).

Various requirements, at least some of which are contradictory to one another, must be set for the CAC algorithms determining the acceptability of a connection request. A CAC algorithm should, for example, be as generic as possible in the sense of its applicability to the management of traffic sources of a wide number of different types. The algorithm must also be simple enough, for example, to be applied in real-time so that it will not form a bottle-neck restricting the call processing capacity of the switch. On the other hand, the algorithm should be very efficient in order to utilize the network resources optimally and to guarantee fair treatment of connections of different types.

Advanced and efficient CAC algorithms tend to be computationally expensive. It would be desirable if the CAC algorithm could calculate in advance the extent of resources the connections require. CAC would then be able to decide faster whether a new connection can be accepted or not. However, it is impossible to know in advance the traffic situation at the arrival time of a new connection request. In other words, it is impossible to know in advance the existing connections and their types, traffic parameters and the quality of service requirements. Thus, CAC cannot calculate in advance, or offline, the resources needed by the connections existing at the time of a new connection request.

As indicated above, when indirect methods are used, the capacity requirement is searched for from a pre-calculated table on the basis of the traffic parameters included in the connection request. The result obtained from the table is then added to the capacity requirement of existing connections to determine whether the connection request can be accepted. Thus, the idea behind these methods is to minimize the real-time computing needed in the decision-making.

The drawback of these methods is that the traffic parameters used in the network and the values possible for each parameter must be known in advance when the tables are formed. Therefore, these methods cannot be flexibly adapted to the various constantly changing network environments. This drawback will be aggravated in future networks where new applications and new terminal equipment are likely to generate traffic with unforeseen characteristics.

SUMMARY OF THE INVENTION

The purpose of the invention is to eliminate the above-mentioned drawback and to bring about a method allowing fast connection admission without the need to update tables in the network elements when new applications or new terminals are introduced into the network.

This goal can be attained by using the solution defined in the independent patent claims.

The basic idea of the invention is to combine the above-mentioned direct method, i.e. real-time computing, with caching by storing a certain number of previous connection requests and their results and using the cached information when a new connection request similar to any of the said previous requests arrives. Thus, the idea is to cache the results of those calculations that are likely to be made repeatedly and that can be calculated without knowledge of the currently existing connections. In this way CAC decision-making can be accelerated significantly. Every time CAC receives a new connection request, it checks from its cache whether a similar connection request has occurred in the recent past. If so, CAC uses the cached results and if not, CAC uses the appropriate algorithm to calculate the results.

By means of the solution according to the invention, CAC decision-making can be speeded up without the need to know the traffic parameters in advance or to take extra measures when the network environment changes.

Within a single network element including several sub-units, it is often preferable to implement CAC so that the decision whether a connection request can be accepted is made separately for each sub-unit. Thus, each sub-unit can be provided with a CAC process of its own to decide on the acceptability for the part of the sub-unit concerned, in which case the connection request must pass through several CAC processes (i.e. through several sub-units) before the entire network element can accept it. In a preferred embodiment of the invention which is intended for this kind of implementation, one CAC processing unit sends to the next CAC processing unit, together with the input data, a flag indicating whether the process found cached results and an identifier identifying the results stored in the cache. In this way only the first of the several CAC units has to search for the results in the cache. This makes a CAC for the entire network element faster and computationally less demanding.

BRIEF DESCRIPTION OF THE DRAWINGS

In the following, the invention and its preferred embodiments are described in closer detail with reference to examples shown in the appended drawings, wherein.

DETAILED DESCRIPTION OF THE INVENTION

ATM Forum has specified five different service classes which relate traffic characteristics and the quality of service requirements to network behavior. These service classes are: constant bit rate (CBR), real-time variable bit rate (rt-VBR), non-real time variable bit rate (nrt-VBR), available bit rate (ABR), and unspecified bit rate (UBR). Each class represents connections which have homogeneous traffic pattern characteristics and QoS requirements. The above-mentioned traffic parameters are used, together with what are termed QoS parameters, to define the service classes. The QoS parameters are: Cell Delay Variation (CDV), Maximum Cell Transfer Delay (Max CTD), and Cell Loss Ratio (CLR).

Figure 1:
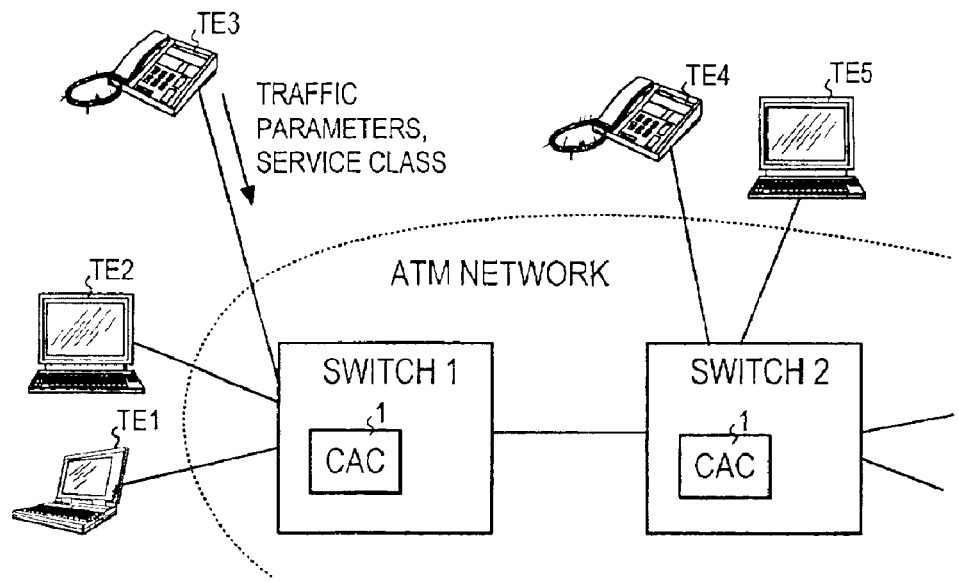
FIG. 1 is a block diagram of a network environment in which the method can be used.

FIG. 1 illustrates an example of the network environment in which the present invention can be implemented. The network comprises a plurality of interconnected (ATM) switches having CAC units (1) which implement the CAC procedure described above. Thus, the CAC units ensure that a connection request received from one of the traffic sources (TE1 to TE5) is accepted only when sufficient resources are available to set-up the connection at its required QoS without degrading the QoS of existing connections. When a connection request arrives in an access node of the network, the node determines the parameters describing the connection or the source and supplies them as an input to the CAC unit. A connection request received from a traffic source includes typically at least the service class required and the traffic parameters describing the source, as shown in connection with terminal TE3 in FIG. 1. Thus, at least part of the input information needed by the CAC unit is normally received with the connection request. Part of the said information can be pre-stored in the network element or calculated there, and part can be received from elsewhere than the traffic source, for example from the network management.

Figure 2:
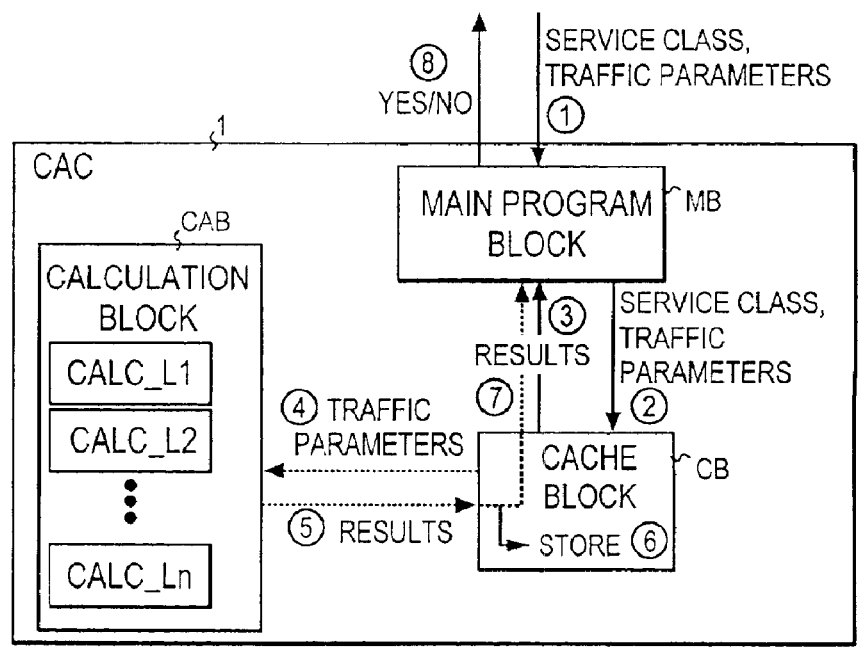
FIG. 2 illustrates the functional blocks carrying out the method in accordance with the invention in a switch.

FIG. 2 is a block diagram of the CAC unit in accordance with the present invention, illustrating the operation of the unit. Various steps of the operation are marked with circled numbers 1 to 8. The CAC unit includes a main program block MB, which receives the input information (such as the service class required and the traffic parameters describing the source) and decides whether to accept or reject the request. Thus, the main program block returns a "yes" or "no" answer in response to the input information supplied to it.

The CAC unit further includes a cache block CB for caching previous requests and their calculated results, as well as a calculation block CAB for performing real time calculation if cached results are not available. When a connection request arrives (step 1), the main program block receives its input information and forwards it to the cache block (step 2). On the basis of this input information, the cache block seeks the results (such as the virtual bandwidth) from its memory. If the cache block finds the results, it supplies (step 3) the information to the main program block, which makes the decision on the basis of the results and the existing connections. For example, if the result is the virtual bandwidth required by the requested connection, the main program block adds this to the virtual bandwidths of existing connections to form an estimate of the total bandwidth needed if the new connection is admitted. The main program block then admits the connection request if the total bandwidth is less than the capacity of the transmission connection (or virtual path), otherwise the request is rejected (step 8).

In this way the request may be processed by the main program block and the cache block only. However, if the cache block does not find results from its memory, it forwards (step 4) the traffic parameters to the calculation block, which calculates the results using the parameters as the input information and supplies these results to the cache block (step 5). The cache block then stores the results together with the corresponding input information into its memory (step 6) so that if a similar connection request arrives in the near future, it can find the result from its memory. Having stored the information, the cache block forwards (step 7) the results to the main program block, which then makes the decision in the above-described manner and accepts or rejects the request (step 8).

As discussed above, when a new connection request arrives from the network, the main program block receives parameters describing the connection or the source, such as the service class and the values of the traffic parameters belonging to that class. The cache block CB includes a data structure illustrated in FIG. 3. In this data structure there is first a service class table or array SC, including one element for each service class used in the network. Each element contains a pointer pointing to a class-specific cache array. In this example the number of classes Li (i=1 ... n) is n, whereby there are also n cache arrays CAi. Each class-specific cache array contains a certain number of elements, each element containing a pointer pointing to a linked list LL. Typically, the length of each cache array is between 10 and 20, i.e. $10 \leq Ci \leq 20$. The length of two or more cache arrays can be equal, for example, all the cache arrays can include 20 elements.

Figure 3:
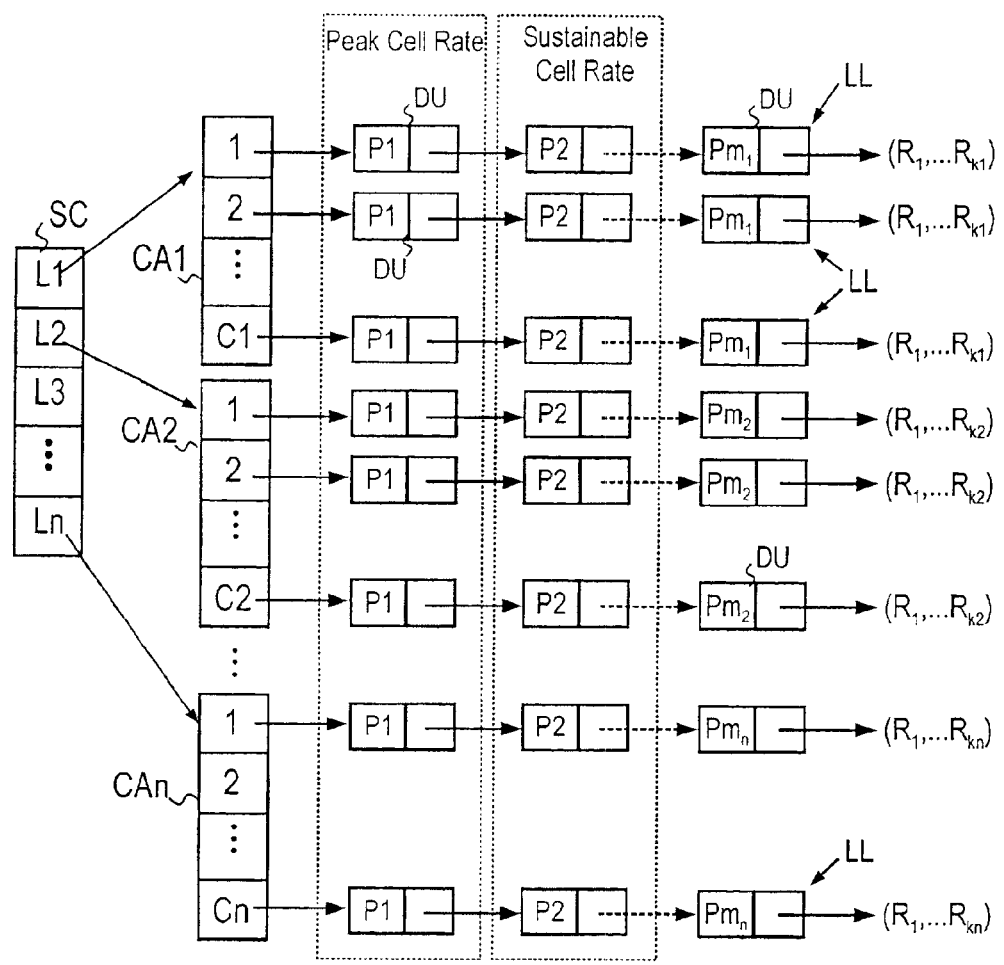
FIG. 3 illustrates the basic embodiment of the data structure used for caching.

Each element of an individual cache array points to its own linked list LL, i.e. there is a dedicated linked list for each cache array element. Each linked list contains a certain number of data units DU, each of which, with the exception of the last one, corresponds to one of the traffic parameters in that class. In the example of FIG. 3, the first data units in each linked list correspond to Peak Cell Rate (PCR), the second data units to Sustainable Cell Rate (SCR), etc. The number of data units in an individual list depends on the traffic class in question. In the example of FIG. 3, the linked lists of the first service class include $m_1$ parameters, the linked lists of the second service class $m_2$ parameters, etc, and the linked lists of the $n^{th}$ service class $m_n$ parameters. Each data unit, with the exception of the last one, contains two elements, so that the first element contains a value for the particular traffic parameter and the second element contains a pointer to the next element in the list.

The last data unit in each linked list includes the results for the particular combination of parameter values in that linked list. In other words, the last data unit includes the results obtained from the calculation block when the traffic parameters in that list are used as input data for the calculation. In the example of FIG. 3, the results include a certain number of values $R_i$ in each class. The results can include a value for one or more quantities, such as bandwidth, delay, buffer space requirement, etc.

At the start-up phase of the network element the data structure of FIG. 3 can be empty. When the first connection request arrives, the main block supplies the service class information and the traffic parameters to the cache block. As the cache block cannot find the results from its data structure (memory), it calls a class-specific subroutine CALC_Li in the calculation block and inputs the traffic parameters of the request to the subroutine. The subroutine returns the results to the cache block, which then stores the parameter values and the results to one of the empty lists belonging to that service class. The cache block then sends the results to the main program block, which uses the results to calculate the decision. In this way the data structure is filled up after a certain number of requests have arrived for each service class.

Alternatively, the data structure can be filled up with the most common values of the traffic parameters and their pre-calculated results before the commissioning of the network element.

Thus, in the normal operation state of the CAC unit the data structure of FIG. 3 is full of parameter values and results. When a connection request arrives, the search in the cache block starts by examining the service class of the connection request. On the basis of this, the element of array SC corresponding to that particular service class is read. The pointer in this element points to one of the cache arrays, which is then searched through for a similar set of parameters. For the first time the search of the class-specific cache array can begin from the first element of the array, for example. The next time the search can begin from the second element, etc. Nevertheless, the search proceeds from the element of the cache array to the linked list addressed from that element, and further along the list as far as the values of the traffic parameters in the list match the value of the corresponding traffic parameter in the connection request. If the parameter value in the list differs from the value of the corresponding traffic parameter in the request, the search jumps to the next element in the cache array and starts to go through the list associated with that element. Finally, either the results are found at the end of the list with sufficiently similar set of parameters or all the lists have been searched through without a hit. In the latter case, the calculation block calculates the results for the main program block.

The search in the data structure can proceed horizontally as described above, i.e. a list is examined until either a parameter in the list and the corresponding parameter in the request differ or the end of the list is arrived at. Another alternative is to proceed vertically so that the first data units of the lists in that particular class are examined first, then the second data units in those lists in which the value of the first parameter matched that of the parameter in the request, etc.

When the data structure is full, it is updated on a FIFO-basis, i.e. if the current results and parameters are stored in the list addressed from cache array element i, the next time the results and parameters are stored in the list addressed from element i+1, etc. In this way the whole content of each class is updated within a certain period. Another alternative is to monitor how frequently each list-specific set of results is used and to replace those sets which are used most infrequently.

Figure 4:
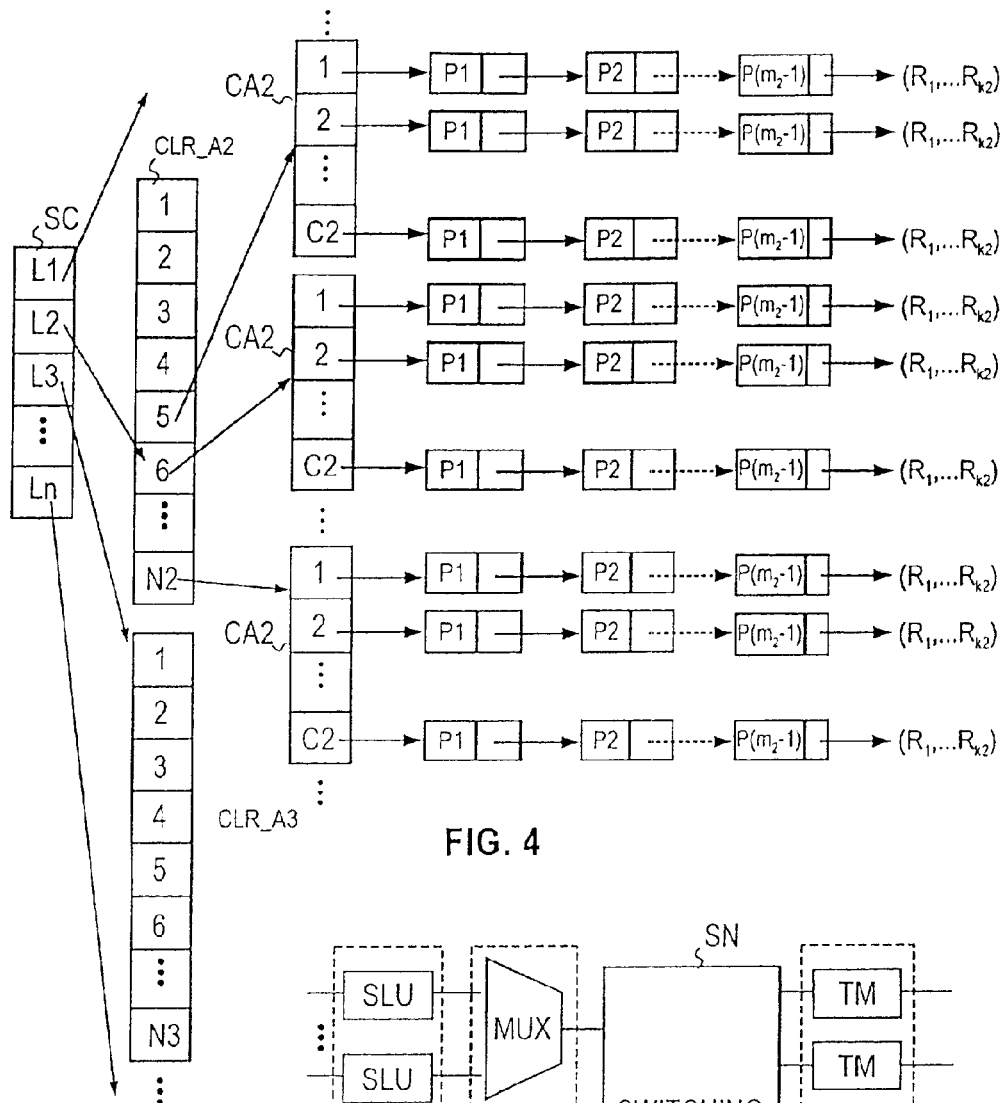
FIG. 4 illustrates another embodiment of the data structure shown in FIG. 3.

FIG. 4 illustrates another embodiment of the data structure in the cache block. This embodiment is based on the observation that a certain traffic parameter can have a limited number (N) of possible values per class, whereby that parameter can be taken out from the list and a separate parameter array can be formed for that parameter. Cell Loss Rate (CLR), for example, is a parameter that has at most 20 different values in a single service class. Therefore, the structure can have a separate array CLR_Ai (i=1 ... n) for each of the traffic classes (two of them shown in the Figure). The number Ni of elements in an individual array corresponds to the number of different values of Cell Loss Rate in that class.

In this case, the Cell Loss Rate included in the connection request is read without any comparison and the search jumps to the element corresponding to the service class in question and the Cell Loss Rate in the request. For example, if the service class is L2 and the Cell Rate is $10^{-6}$, the search jumps directly to the sixth element (which in this example is assumed to correspond to the value $10^{-6}$) in the array of class L2 (as shown in the Figure). Each element in the array includes a pointer which forms the beginning of the linked lists. The lists are similar to those in the first embodiment, except that each list includes one data unit less because the data units corresponding to Cell Loss Rate have been removed from the lists.

In the embodiment of FIG. 4, one comparison is saved per each list examined as compared to the embodiment of FIG. 3. However, the drawback of the embodiment of FIG. 4 is that the number of lists is N-fold, as separate lists must exist for each of the Cell Loss Rate values. Consequently, the memory space requirement is about N-fold as compared to the embodiment of FIG. 3 (the number of different Cell Loss Rate values may vary in different classes, whereby the memory space requirement is not exactly N-fold).

Figure 5:
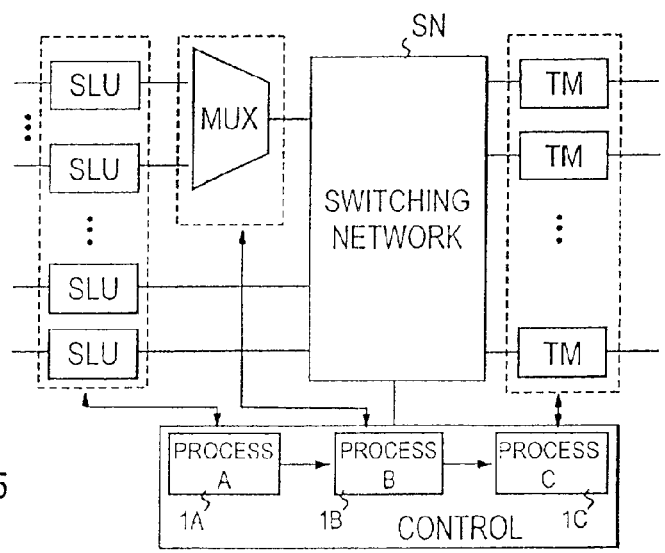
FIG. 5 illustrates a switch in which connection admission control is performed by several successive CAC processes.

In the above description it was assumed that one CAC unit or CAC process attends to connection admission within the switch. However, it is also possible to implement connection admission control as a "multistage" unit or process according to the architecture of the switch, so that there is a CAC unit/process for each "stage" or sub-unit of the switch. FIG. 5 illustrates this by showing a generic switch architecture. Subscribers are connected to the switching network SN or to a multiplexer MUX through a subscriber line unit SLU. Multiplexers are used for locally concentrating subscriber traffic within the switch. The switch is connected to other switches through trunk modules TM. Within the switch, the overall connection admission control can be implemented, instead of one CAC process, by means of several successive CAC processing units described above so that each unit attends to the connection admission control in a certain stage or sub-unit of the switch. Consequently, in a switch according to FIG. 5 the overall connection admission control could be implemented, for example, so that the first CAC processing unit (1A) handles connection admission control in the subscriber line units SLU, the second CAC unit (1B) handles connection admission in the multiplexer(s), and the third CAC unit (1C) handles connection admission control in the trunk modules. Thus, depending on the implementation, a connection request may have to pass through several CAC processes within one switch. The request is accepted if each CAC process has accepted it, otherwise it is rejected.

If the connection admission control described above is used in a straightforward manner in a "multistage" CAC implementation, each CAC process has to make a cache lookup in order to check whether it has served similar requests before. This computationally rather demanding process is avoided in a preferred embodiment of the invention which is discussed in the following.

Figure 6:
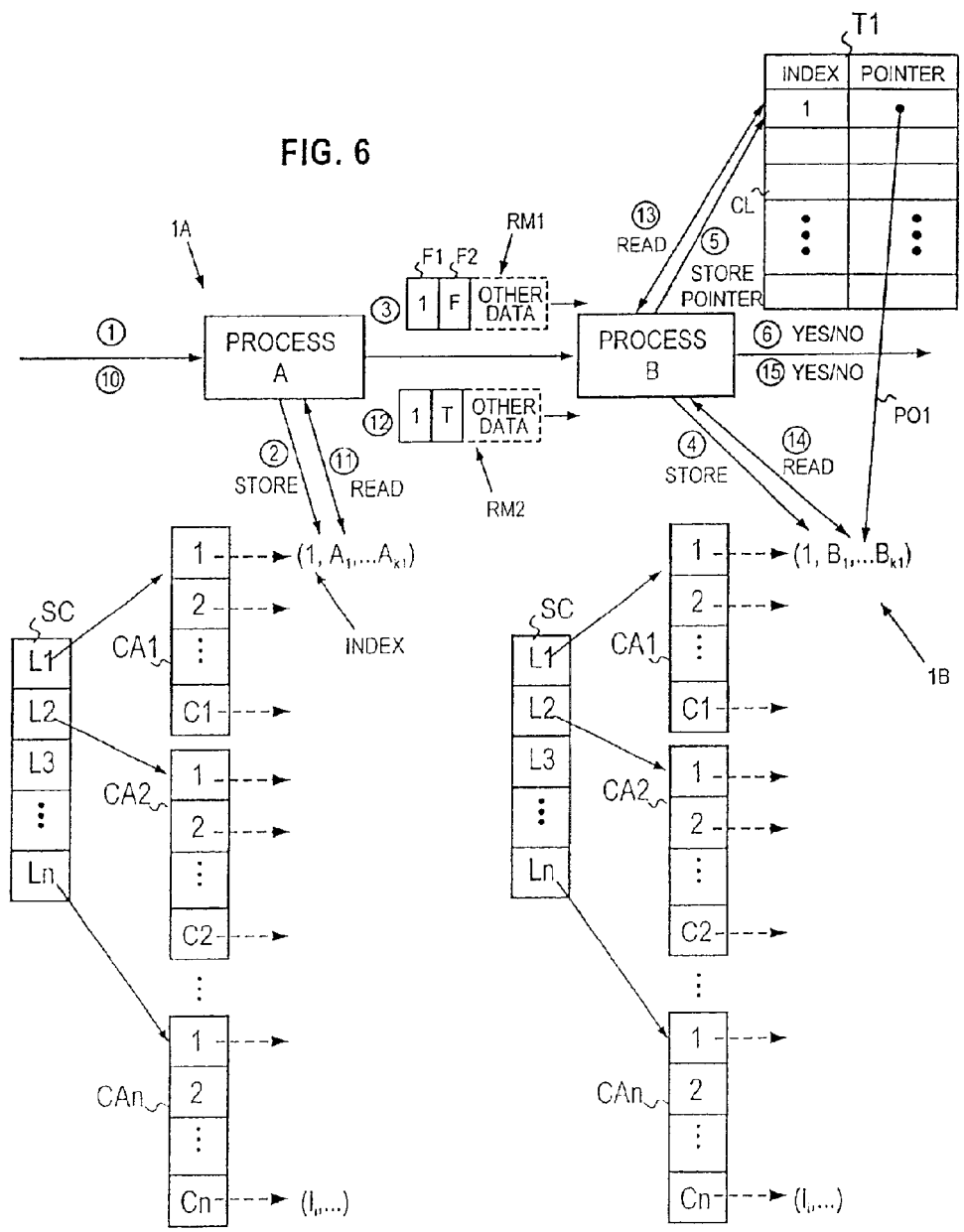
FIG. 6 illustrates the operation of successive CAC processes.

For the sake of simplicity let us assume first that the network element comprises two CAC units, so that a connection request must pass through two successive CAC processes, A and B, within the network element before it can be accepted. FIG. 6 illustrates the operation of these two units/processes. Various steps of the operation are marked with circled numbers so that numbers 1 to 6 illustrate the steps associated with a connection request that arrives for the first time and numbers 10 to 15 illustrate the steps associated with a later connection request for which the results can already be found from the cache. As can be seen from the figure, each process has a cache of its own, which is similar to the caches described above. (In the figure, the linked lists have been shortened to fit two successive caches on the paper. For the sake of simplicity, it is further assumed in the figure that each process includes the main program block MB and the calculation block CAB described above.)

When a connection request arrives at process A for the first time (step 1), process A calculates the results and supplies the results to its cache block, as described above (step 2). In this embodiment, however, process A stores, together with the results, an index which indicates the linked list in question (i.e. the linked list where the results are stored). In the example of FIG. 6, the first linked list corresponds to index value one, the second linked list to index value two, etc., and the last linked list corresponds to index value $I_i$ which is equal to the total number of elements in all the cache arrays. Thus, process A stores a record $(i, A_1, \ldots A_{k1})$ in the last data unit of one of the linked lists, where i is the index indicating the linked list where the record is stored and $A_1, \ldots A_{k1}$ are the results obtained from the calculation block. In this case i equals 1, since this is the first connection request received by A. If process A then accepts the connection request, it forwards the request to process B (i.e. to CAC unit 1B) by sending a message RM1 to process B (step 3). This message includes field F1, which contains the index that process A used when processing that request, and field F2, which contains a flag indicating whether process A found the results from its cache. In this case, field F2 contains a value F (false), since process A had to calculate the results. The message also includes other data, such as the service class and the traffic parameters (i.e. the input information required by a CAC unit, which was discussed in connection with FIG. 2).

When process B (CAC unit 1B) receives message RM1, it updates its cache in the same way as process A did (step 4). The calculated results $(B_1, \ldots B_{k1})$ are stored, together with the index received, in the linked list corresponding to the index (i.e. in this case in the first linked list). Process B further stores a pointer to the stored record of results $(1, B_1, \ldots B_{k1})$ in table T1. This table has been formed in advance, before the commissioning of the network element, to be in association with process B, and it is empty before the first connection request arrives. The table contains one cell (CL) for each linked list, and it is indexed by the indices that process B receives from process A. When the table is full, each cell contains a pointer to the record of results in the cache of process B. Thus, since the index received from process A was in this case 1, the pointer P01 to the record of results $(1, B_1, \ldots B_{k1})$ is stored in the cell corresponding to the index value 1 (step 5). After this process B either accepts or rejects the connection request (step 6). As the pointer points to the record of results, the value of the pointer word is the same as the value of the pointer word in the second last data unit of the linked list where the record of results was stored.

When a similar request arrives again (step 10), process A finds the results from its cache (step 11). It then sends a message (RM2) to process B (step 12), the message including in field F1 the value of the index found from the cache and a value T (true) in field F2, the latter now indicating to process B that process A found the results from its cache. When process B receives this value in field F2, it knows that it will obtain the results directly by means of the pointer which corresponds to the index received in field F1 of the message. It therefore first reads the pointer corresponding to index value 1 (step 13) and then the results from the memory location addressed by that pointer (step 14). After this, process B either accepts or rejects the connection request (step 15).

When the caches are full and process A overwrites an entry in its cache, it uses the index corresponding to the linked list in question and supplies this index, together with value F in field F2, to process B. Process B then knows that it must calculate the results, store the record of results at the end of the linked list corresponding to the received index value, and store a pointer into that cell of table T1 which corresponds to the received index value.

As is obvious above, two new fields are needed in the messages from A to B (i.e. in the input information) as compared to the single process system: the field indicating the index and the flag indicating whether process B can use direct pointing (i.e. read the pointer corresponding to the received index value and use the set of results addressed by that pointer).

If there are more than two CAC processes within the network element, each process must keep a separate table for each such process from which it receives connection requests. For example, in the embodiment of FIG. 5, process C has a separate table for process B. The last CAC process in the chain does not necessarily have to store the received index with the results, since it does not have to supply the index to any other CAC process.

Instead of a pointer pointing the results, the table(s) T1 could also include the calculated results. However, the length of a pointer is only one word, whereas the results require much more memory space. In terms of memory space, it is therefore advantageous to store pointers in the table(s).

By using "multistage" implementation as described above, only the first of the several CAC processes/units has to do the cache lookup. This makes the connection admission control of the network element faster and computationally less demanding.

Although the invention has been described here in connection with the examples shown in the attached figures, it is clear that the invention is not limited to these examples, as it can be varied in several ways within the limits set by the attached patent claims. The following describes briefly some possible variations.

As mentioned above, the set of results calculated in the calculation block and stored in the cache can include one or more values indicating in some way the capacity requirement of the traffic source that sent the connection request. Thus, the number of values resulting from the calculation is not essential but rather that the parameters input to the calculation block and the value(s) resulting from the calculation are stored in the cache. Neither is it essential what these parameters are. Moreover, the parameters can be determined in many ways: all the parameters can be simply extracted from the connection request, for example, or one or more of the parameters can be calculated in the network element in response to the reception of the request.

When a parameter value in the linked list is compared to the value of the corresponding parameter in the request, an exact match is normally required in order to proceed further in that list. However, it is also possible that there is always a match when the difference between the values is smaller than a predetermined limit value. This interpretation of a "match" can also depend on the type of parameter.

In "multistage" implementation, it is also possible to combine the functions of the successive CAC processes so that some functions of the CAC unit are realized by a functional block which is common for several CAC processes. As discussed above, each unit has a cache of its own. However, some other parts of the CAC units can be implemented as centralized, especially because the CAC processes operate in succession. Thus, the functions of the main program block and the calculation block can be implemented by a single main program block or a single calculation block which is common for several or all CAC processes. In these cases a centralized main program block estimates the total capacity requirement and makes the decision for several or all CAC processes, and a centralized calculation block calculates the results for several or all CAC processes.

What is claimed is:

1. A method of carrying out connection admission control in a communications network, the method comprising the steps of receiving connection requests from traffic sources, in response to a connection request received from a traffic source, determining a request-specific set of input data, calculating a set of results by means of said set of input data, said set of results indicating a capacity requirement of said traffic source, estimating a total capacity requirement on the basis of said set of results and the capacity requirement of existing connections, and deciding on the acceptability of said connection request on the basis of the estimated total capacity requirement, wherein the method further includes the steps of in response to said calculation, storing said set of input data and the corresponding set of results into a cache, in response to said determination, searching in the cache for a set of data similar to the request-specific set of input data, and using the stored set of results for estimating the total capacity when a similar set of data is found from the cache, whereby the calculation of the set of results is omitted when a similar set of data is found.

2. A method according to claim 1, wherein the connection requests belong to several service classes, wherein the sets of input data are stored class-specifically by forming a cache array for each service class, each cache array including a certain number of elements.

3. A method according to claim 2, wherein a pointer is stored in an individual element of a cache array, said pointer pointing to a data unit in a linked list of data units, in which list the set of results are stored in the last data unit and the set of input data is stored in the other data units.

4. A method according to claim 3, wherein the request-specific input data includes several traffic parameters of different types, wherein the values of the traffic parameters are stored in said other data units, one traffic parameter per data unit, and a similar set of data is searched for by starting from a certain element of a class-specific cache array and proceeding in the list data unit by data unit until either a traffic parameter value stored in the data unit differs from the value of the corresponding traffic parameter in the set of input data or the set of results is reached.

5. A method according to claim 3, wherein the set of input data includes several traffic parameters of different types, wherein the values of the traffic parameters are stored in said other data units, the value of one traffic parameter in each data unit, and a similar set of data is searched for by examining first the first data unit in each class-specific list, then the second data units in those lists in which the value of the first parameter matches the value of the corresponding parameter in the request-specific set of input data, then the third data units in those lists in which the values of the first and the second parameter match the values of the corresponding parameters in the request-specific set of input data, etc.

6. A method according to claim 1, wherein the connection requests belong to different service classes and the request-specific set of input data includes several traffic parameters of different types, wherein a separate parameter array is formed for each of the service classes, an individual class-specific parameter array including $N_i$ elements, where $N_i$ is the number of possible values of a selected traffic parameter in service class $i$ ($i=1 \ldots N$), each element pointing to a cache array including a certain number of elements.

7. A method according to claim 6, wherein a pointer is stored in an individual element of a cache array, said pointer pointing to a data unit in a linked list of data units, in which list the set of results are stored in the last data unit and the values of all the other traffic parameters except the value of said selected parameter are stored in the other data units, with one parameter value per each data unit.

8. A method according to claim 1, wherein the sets of input data and the corresponding sets of results stored in the cache are updated on a FIFO basis by replacing the oldest pair of sets when a new set of input data and the corresponding set of results is stored in the cache.

9. A method according to claim 1, wherein monitoring how often each set of results is found from the cache, and in response to said monitoring, selecting the set of input data and the corresponding set of results to be replaced by a new set of input data and a new set of results.

10. A method according to claim 1, wherein using several CAC processes within a network element which operate in a chain so that when a process has accepted the connection request for its part, the next process in the chain starts, whereby each process (1) stores said set of input data and the corresponding set of results into a cache provided for that process, (2) uses the stored set of results for estimating the total capacity when a similar set of data is found from the cache, (3) estimates a total capacity requirement on the basis of said set of results and the capacity requirement of existing connections, and (4) decides for its part on the acceptability of said connection request on the basis of the estimated total capacity requirement, and accepting the connection request when all processes accept it.

11. A method according to claim 10, wherein in two successive CAC processes in said chain an identifier is stored for each set of results at the preceding process (A), the subsequent process (B) is informed of the identifier relating to the set of results obtained in the preceding process, and a flag is used for indicating to the subsequent process whether the preceding process found a similar set of data from its cache.

12. A method according to claim 11, wherein calculating the set of results in the subsequent process when said flag indicates that the preceding process failed to find a similar set of data in its cache, storing at least said set of input data and the calculated set of results in the cache, and storing a pointer in a memory location defined by said identifier, said pointer pointing to the set of results stored in the cache of the subsequent process.

13. A method according to claim 12, wherein further storing the identifier in the cache of the subsequent process.

14. A method according to claim 12, wherein reading the pointer identified by said identifier when the preceding process indicates that it has found a similar set of data from its cache and using the set of results addressed by said pointer.

15. A connection admission control arrangement for a network element adapted to receive connection requests from traffic sources in a communications network, the arrangement comprising calculation means for calculating a set of results by supplying a set of input data to said calculation means, said set of results indicating the capacity needed by a traffic source, means for determining said set of input data in response to a connection request, estimation means for estimating a total capacity requirement on the basis of said set of results and the capacity requirement of connections existing in the network, and decision means for deciding on the acceptability of said connection request on the basis of the total capacity requirement, wherein the arrangement further includes storing means for storing said set of input data and the corresponding set of results into a cache, said storing means being responsive to said calculation means, and searching means for looking for a set of data similar to said set of input data from the storing means, said searching means being adapted to supply to the estimation means the set of results found in the storing means when a similar set of input data is found and to control the calculation means for calculating a set of results when no similar set of input data is found in the storing means.

16. A connection admission control arrangement according to claim 15, wherein the storing means includes a cache array (CA1 . . . CAn) for each service class used in the network, each cache array including a certain number of elements, whereby each element can be empty or include a pointer pointing to a data unit in a linked list of data units, each linked list being empty or Including a set of input data and the corresponding set of results.

17. A connection admission control arrangement according to claim 15, wherein the set of input data comprises a set of traffic parameters, wherein the storing means includes a separate parameter array for each service class used in the network, an individual parameter array including Ni elements, where Ni is the number of possible values of a selected traffic parameter in service class i (i=1 . . . N), each element including a pointer pointing to a cache array including a certain number of elements, whereby each cache array element can be empty or include a pointer to a data unit in a linked list of data units, each linked list being empty or including all the other traffic parameters in the set of input data, except said selected traffic parameter, and the set of results corresponding to said traffic parameters.

18. A connection admission control arrangement according to claim 15, wherein the arrangement comprises several separate connection admission control units (1A, 1B, 1C), each unit including at least the storing means, whereby the total capacity requirement is estimated for each unit and a unit-specific decision is made on the acceptability of said connection request, and the connection admission control units are connected operably in series so that the connection request is forwarded to the next unit when the connection request has been accepted for the preceding unit, whereby the connection request is accepted in the network element when it has been accepted for all units.

19. A connection admission control arrangement according to claim 18, wherein each connection admission control unit further includes the calculation means, the estimation means and the decision means.

* * * * *